United States Patent [19]

Brown et al.

[11] 3,896,181

[45] July 22, 1975

[54] PROCESS FOR PRODUCING CHLOROPRENE

[75] Inventors: Peter John Nicholas Brown, Epsom; Clifford William Capp, Ewell, both of England

[73] Assignee: BP Chemicals International Limited, London, England

[22] Filed: Oct. 11, 1973

[21] Appl. No.: 405,324

[30] Foreign Application Priority Data

Oct. 26, 1972 United Kingdom............... 49350/72

[52] U.S. Cl.............................. 260/655; 260/654 D
[51] Int. Cl....................... C07c 17/34; C07c 21/20
[58] Field of Search......................... 260/655, 654 D

[56] References Cited

UNITED STATES PATENTS

| | | | |
|---|---|---|---|
| 2,180,115 | 11/1939 | Lange et al. | 260/655 |
| 2,542,976 | 2/1951 | Airs et al. | 260/654 D |
| 2,948,761 | 8/1960 | Jenkins | 260/655 |
| 3,060,245 | 10/1962 | Wofford | 260/655 |

*Primary Examiner*—D. Horwitz
*Attorney, Agent, or Firm*—Brooks Haidt Haffner & Delahunty

[57] ABSTRACT

This invention relates to the dehydrochlorination of dichlorobutenes in an anhydrous medium using metal alkoxides.

10 Claims, No Drawings

PROCESS FOR PRODUCING CHLOROPRENE

The present invention relates to a process for the production of chloroprene by dehydrochlorinating 3,4-dichlorobutene-1 using a metal alkoxide.

Processes for the dehydrochlorination of dichlorobutenes have hitherto employed aqueous systems, especially aqueous alkali systems. One of the principal disadvantages of such processes is the formation of 1-chlorobutadiene-1,3 and other by-products during the dehydrochlorination. 1-Chlorobutadiene-1,3 is undesirable since the polymer obtained from chloroprene contaminated with 1-chlorobutadiene-1,3 is usually coloured and is of inferior quality. The separation of 1-chlorobutadiene-1,3 (b.p. 68°C) from chloroprene (59.4°C) is expensive. Furthermore, the presence of water in the dehydrochlorination stage makes it uneconomic to separate and/or recover the inorganic chloride salts present in the effluent. It has now been found that the formation of 1-chlorobutadiene-1,3 during the dehydrochlorination of 3,4-dichlorobutene-1 to chloroprene can be reduced considerably by using a suitable dehydrochlorinating agent.

Accordingly, the present invention is a process for producing chloroprene comprising dehydrochlorinating 3,4-dichlorobutene-1 in a substantially non-aqueous environment by contact with a metal alkoxide wherein the alcohol moiety in the alkoxide has at least 3 carbon atoms.

The alcohol moiety of the metal alkoxide is suitably derived from a monohydric alcohol containing between 3 and 20 carbon atoms. Metal alkoxides derived from isopropanol, n-butanol, tertiary-butanol and secondary-butanol are particularly preferred.

The metal component of the alkoxide is preferably an alkali metal from Group I of the Periodic Table, especially sodium or potassium.

The metal alkoxide may be used either as a solid or as a solution for the dehydrochlorination. Where the solid alkoxide is used, the dichlorobutene reactant acts as a solvent. Where a solution is employed, the solvent is suitably inert to the dehydrochlorination reaction. For example, the solvent may be the alcohol corresponding to the alkoxide used.

The dehydrochlorination reaction itself is conventional and can be carried out according to any of the known methods in the art, for example as described by F. J. Bellringer in Education in Chemistry, 1971, Vol. 8, p. 148.

One of the advantages of the present invention is that the inorganic chloride salts are scarcely soluble in alcohols and are therefore readily recovered in solid form.

The reaction may be carried out over a moderately wide range of temperatures, e.g. between 40° and 100°C, preferably between 50° and 70°C.

It is preferable to carry out the dehydrochlorination process of the present invention in the presence of a polymerization inhibitor. Suitable examples of such inhibitors are phenothiazine, dihydric phenols such as tert-butyl catechol and nitroso compounds.

The reaction is suitably carried out in an inert atmosphere. The inert atmosphere may be provided by nitrogen or a mixture containing nitrogen and nitric oxide.

It is preferable to carry out the dehydrochlorination reaction at atmospheric pressures although subatmospheric or super-atmospheric may also be used.

The process for the present invention can be carried out in a continuous manner by distilling off the chloroprene formed directly and simultaneously from the reaction vessel. Alternatively, the reaction product may be passed into a separate distillation unit, after having separated off any solid salts.

The process of the present invention is further illustrated with reference to the following examples.

EXAMPLES 3,4-Dichlorobutene-1 (3,4-DCB-1) (0.5 mole) containing phenothiazine (0.1%) was added to a stirred solution of an alkoxide (as shown in the Table) in the corresponding alcohol at 60°C. The mixture was stirred at 60°C for a further 30 min. and then the chloroprene (CP) and 1-chlorobutadiene (1-CBD) products were separated by distillation through a short fractionating column at atmospheric pressure under nitric oxide/nitrogen. The CP/1-CBD yield ratios thus obtained are shown in the Table below.

TABLE

| Alkoxide | Solvent | Initial Alkoxide % | Initial mole ratio alkoxide/ 3,4-DCB-1 | Yield CP Yield 1-CBD |
|---|---|---|---|---|
| Sodium ethoxide | ethyl alcohol | 10.7 | 1.25 | 148* |
| Potassium ethoxide | ethyl alcohol | 10.0 | 1.25 | 138* |
| Sodium iso-propoxide | iso-propyl alcohol | 10.8 | 1.25 | 256 |
| Potassium iso-propoxide | iso-propyl alcohol | 10.7 | 1.25 | 252 |
| Potassium tert-butoxide | tert-butyl alcohol | 16.6 | 1.25 | 265 |
| Potassium n-butoxide | n-butyl alcohol | 16.6 | 1.25 | 216 |
| Sodium sec-butoxide | sec-butyl alcohol | 19.1 | 1.25 | 228 |
| Sodium 2-butoxy ethoxide | 2-butoxy-ethanol | 17.0 | 1.25 | 386 |

*Not according to the invention.

We claim:

1. A process for producing chloroprene comprising dehydrochlorinating 3,4-dichlorobutene-1 in a substantially non-aqueous environment by contact with a metal alkoxide wherein the alcohol moiety in the alkoxide has between 3 and 20 carbon atoms.

2. A process according to claim 1 wherein the alcohol moiety in the alkoxide is derived from an alcohol selected from iso-propanol, normal butanol, secondary butanol and tertiary butanol.

3. A process according to claim 1 wherein the dehydrochlorination is carried out at a temperature between 40° and 100°C.

4. A process according to claim 1 wherein the metal alkoxide is employed as a solution in a solvent inert to the dehydrochlorination reaction.

5. A process according to claim 4 wherein the solvent is an alcohol corresponding to that in the alkoxide used.

6. A process according to claim 1 wherein the dehydrochlorination is carried out in the presence of a polymerization inhibitor selected from phenothiazine, dihydric phenols and nitroso compounds.

7. A process according to claim 6 wherein the dihydric phenol is tertiarybutyl catechol.

8. A process according to claim 1 wherein the reaction is carried out in an inert atmosphere provided by gases selected from nitrogen or a mixture containing nitrogen and nitric oxide.

9. A process according to claim 1 wherein the dehydrochlorination is carried out a continuous manner by distilling off the chloroprene formed directly and simultaneously from the reaction vessel.

10. A process according to claim 1 wherein the metal in the metal alkoxide is an alkali metal selected from sodium and potassium.

* * * * *